United States Patent
Farooq et al.

(10) Patent No.: US 10,787,139 B2
(45) Date of Patent: Sep. 29, 2020

(54) RETRACTABLE VEHICLE LEG STIFFENER

(71) Applicant: Ford Global Technologies, LLC, Dearborn, MI (US)

(72) Inventors: S. M. Iskander Farooq, Novi, MI (US); Saeed David Barbat, Novi, MI (US); James Chih Cheng, Troy, MI (US); Srinivasan Sundararajan, Ann Arbor, MI (US); Mohammad Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 123 days.

(21) Appl. No.: 16/011,786

(22) Filed: Jun. 19, 2018

(65) Prior Publication Data

US 2019/0381961 A1    Dec. 19, 2019

(51) Int. Cl.
*B60R 19/38* (2006.01)
*B60R 21/34* (2011.01)

(52) U.S. Cl.
CPC .............. *B60R 19/38* (2013.01); *B60R 21/34* (2013.01)

(58) Field of Classification Search
CPC .............................. B60R 19/38; B60R 121/34
USPC ........................................................... 701/45
See application file for complete search history.

(56) References Cited

U.S. PATENT DOCUMENTS

| | | | |
|---|---|---|---|
| 3,945,672 A * | 3/1976 | Wong | B60T 7/22 293/5 |
| 6,394,512 B1 | 5/2002 | Schuster et al. | |
| 8,950,800 B1 * | 2/2015 | Farooq | B60R 21/34 296/187.04 |
| 9,365,176 B2 * | 6/2016 | Revankar | B60R 19/40 |
| 9,446,726 B2 * | 9/2016 | Cuddihy | B60R 19/023 |
| 9,821,754 B2 * | 11/2017 | Farooq | B60R 19/12 |
| 2003/0137156 A1 * | 7/2003 | Ledford | B60R 19/56 293/102 |

FOREIGN PATENT DOCUMENTS

| | | |
|---|---|---|
| CN | 105857229 A | 8/2016 |
| JP | 2005132219 A | 5/2005 |

* cited by examiner

*Primary Examiner* — Yazan A Soofi
(74) *Attorney, Agent, or Firm* — Frank A. MacKenzie; Bejin Nieneman PLC (57) ABSTRACT

A vehicle includes a bumper. The vehicle includes a pair of swing arms. The vehicle includes a beam pivotally supported by the swing arms. The vehicle includes a crossmember fixed to the beam and movable from a retracted position toward the bumper to an extended position. The vehicle includes a lock operatively engaging one of the swing arms when the crossmember is in the extended position.

20 Claims, 9 Drawing Sheets

RETRACTABLE VEHICLE LEG STIFFENER

BACKGROUND

Several current national and multi-national vehicle safety regulatory bodies have formulated pedestrian safety standards which new vehicles will be measured against. At least one such pedestrian safety test attempts to measure or estimate the degree of injury that will be inflicted on the lower leg of a standing or walking pedestrian if struck by a relatively slow-moving vehicle. These tests generally indicate that a greater vertical distance between a bumper and a road surface may result in greater injury to the pedestrian's lower leg. Simply lowering the height of the bumper in order to improve performance in such a test may not be a practical solution because of the resulting reduction in vehicle ground clearance. Having a relatively large ground clearance is particularly important for vehicles that may operate off of paved surfaces.

DETAILED DESCRIPTION

A vehicle includes a bumper. The vehicle includes a pair of swing arms. The vehicle includes a beam pivotally supported by the swing arms. The vehicle includes a crossmember fixed to the beam and movable from a retracted position toward the bumper to an extended position. The vehicle includes a lock operatively engaging one of the swing arms when the crossmember is in the extended position.

The vehicle may include a processor and a memory storing instructions executable by the processor to, upon determining a vehicle speed is greater than a predetermined threshold, disengage the lock from the swing arm and then move the crossmember to the retracted position.

The lock may operatively engage one of the swing arms when the crossmember is in the retracted position.

The vehicle may include a processor and a memory storing instructions executable by the processor to, upon determining a vehicle speed is greater than a predetermined threshold, actuate the lock to disengage from one of the swing arms and then move the crossmember to the extended position.

The memory may store instructions executable by the processor to, upon determining the vehicle speed is greater than a second predetermined threshold that is higher than the predetermined threshold, actuate the lock to disengage from one of the swing arms and then move the crossmember to the retracted position.

The memory may store instructions executable by the processor to inhibit moving the crossmember to the extended position in response selection of an off-road mode.

The vehicle may include a processor and a memory storing instructions executable by the processor to move the crossmember to the extended position and then actuate the lock to operatively engage one of the swing arms.

The swing arms may be elongated along a vehicle-longitudinal axis when the crossmember is in the retracted position.

The bumper may include a first end and a second end spaced from each other along a cross-vehicle axis, and the crossmember may extend from the first end to the second end.

The lock may include a latch, and one of the swing arms may include a first surface that abuts the latch when the crossmember is in the extended position and a second surface that abuts the latch when the crossmember is in the retracted position.

One of the swing arms may include a linear portion and a curved portion extending from the linear portion.

The vehicle may include a second pair of swing arms spaced from the pair of swing arms along a cross-vehicle axis, a second beam pivotally supported by the second pair of swing arms, the second beam fixed to the crossmember, and a second lock operatively engaging one of the swing arms of the second pair of swing arms when the crossmember is in the extended position.

An assembly includes a base. The assembly includes a pair of swing arms supported by the base, each pivotable along a path. The assembly includes a beam pivotally supported by the swing arms. The assembly includes a crossmember fixed to the beam. The assembly includes a lock supported by the base and moveable between a locked state in the path of one of the swing arms and an unlocked state spaced from the paths of both the swing arms.

One of the swing arm may include a main body and an extension extending transversely from the main body and abutting the lock when the crossmember is in an extended position.

The assembly may include a motor supported by the base and operatively coupled to one of the swing arms.

The lock may operatively engage one of the swing arms when the crossmember is in a retracted position.

The lock may operatively engage one of the swing arms when the crossmember is in an extended position.

One of the swing arms may include a first surface that abuts the lock when the crossmember is in the extended position and a second surface that abuts the lock when the crossmember is in a retracted position.

One of the swing arms may include a first surface that abuts the lock when the crossmember is in the extended position and a second surface that urges the lock to the unlocked state when the crossmember is moved from a retracted position to the extended position.

One of the swing arms may include a linear portion extending from the base and a curved portion extending from the linear portion.

With reference to the Figures, wherein like numerals indicate like parts throughout the several views, a vehicle 20 includes a bumper 22 and a stiffener assembly 24, 124. The stiffener assembly 24, 124 includes one or more pairs of swing arms 26, 126. The swing arms 26, 126 are each pivotable along a path P. The stiffener assembly 24, 124 includes one or more beams 28, each beam 28 pivotally supported by one of the pairs of the swing arms 26, 126. The stiffener assembly 24, 124 includes a crossmember 30 fixed to the beams 28. The crossmember 30 is movable from a retracted position toward the bumper 22 to an extended position, e.g., via pivoting of the swing arms 26, 126 along the respective path P. In the retracted position the crossmember 30 enables the vehicle 20 to have greater ground clearance than in the extended position. In the extended position the crossmember 30 improves performance of the vehicle 20 in safety tests that attempt to measure or estimate the degree of injury that will be inflicted on a lower leg of a pedestrian if struck by the vehicle 20. The stiffener assembly 24, 124 includes one or more locks 32 that each operatively engage one of the swing arms 26, 126 when the crossmember 30 is in the extended position, e.g., to maintain the crossmember 30 in the extended position during an impact to the vehicle 20. The lock 32 is moveable between a locked state in the path P of one of the swing arms 26, 126 and an unlocked state spaced from the paths P the swing arms 26, 126. One embodiment of the stiffener assembly 24 is shown in FIGS. 1-5, and another embodiment of the stiffener assembly 124 is shown in FIGS. 6-9.

The vehicle 20 may be any passenger or commercial automobile such as a car, a truck, a sport utility vehicle, a crossover vehicle, a van, a minivan, a taxi, a bus, etc.

The vehicle 20 defines a vehicle-longitudinal axis A1, i.e., extending between a front and a rear of the vehicle 20. The vehicle 20 defines a cross-vehicle axis A2, i.e., extending between a left side and a right side of the vehicle 20. The vehicle 20 defines a vehicle-vertical axis A3, i.e., extending between a top and a bottom of the vehicle 20. The vehicle-longitudinal axis A1, the cross-vehicle axis A2, and the vehicle-vertical axis A3 are perpendicular to each other. The front, rear, left side, right side, top, and bottom may be relative to an orientation of an operator of the vehicle 20. The front, rear, left side, right side, top, and bottom may be relative to an orientation of controls for operating the vehicle 20, e.g., an instrument panel, a user interface 72, etc. The front, rear, left side, right side, top, and bottom may be relative to a forward driving direction when wheels of the vehicle 20 are all parallel with each other.

The vehicle 20 may include a body and a frame. The body and frame may be of a unibody construction. In the unibody construction, the body, e.g., rockers, pillars, roof rails, etc., serve as the vehicle 20 frame, and the body (including the rockers, pillars, roof rails, etc.) is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be any suitable material, for example, steel, aluminum, etc.

The vehicle 20 may include one or more bases 34. Each base 34 may pivotally support one of the pairs of the swing arms 26, 126, e.g., via hinge pin or any other suitable structure. The base 34 may be fixed to the frame and/or body, e.g., via fastener, welding, etc. The base 34 may be a component of the frame and/or body. The base 34 may be metal or any other suitable material.

The bumper 22 distributes force and absorbs energy, e.g., during an impact to the vehicle 20. The bumper 22 may be at the front of the vehicle 20. The bumper 22 includes a first end 36 and a second end 38. The first end 36 and the second end 38 may be spaced from each other along the cross-vehicle axis A2. For example, the first end 36 may be at the right side of the vehicle 20, and the second end 38 may be at the left side of the vehicle 20. The bumper 22 may be elongated between the first end 36 and the second end 38, e.g., along the cross-vehicle axis A2. The bumper 22 may be supported by the frame and/or body. The bumper 22 may be a component of the frame and/or body.

The bumper 22 may include a bumper beam 40. The bumper beam 40 may reinforce the structural integrity of the vehicle 20. The bumper beam 40 may be any suitable material, for example, steel, aluminum, etc.

The bumper 22 may include a fascia 42. The fascia 42 may be elongated parallel to the bumper beam 40. The fascia 42 may extend around the bumper beam 40. The fascia 42 may present a class-A surface, i.e., a surface specifically manufactured to have a high-quality, finished aesthetic appearance free of blemishes.

Figure 1:
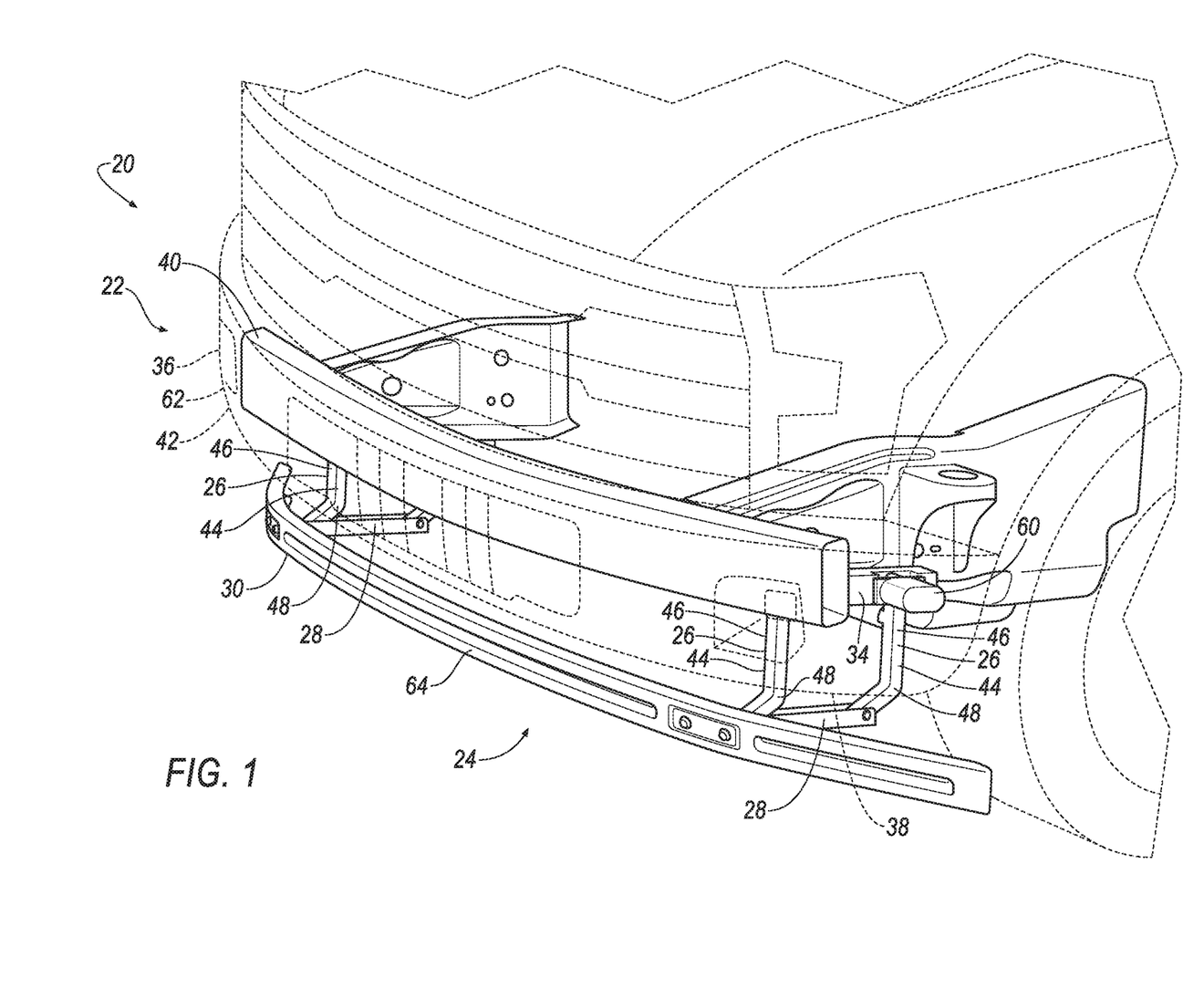
FIG. 1 is a perspective view of a vehicle with a stiffener assembly having a crossmember in an extended position.
Figure 2:
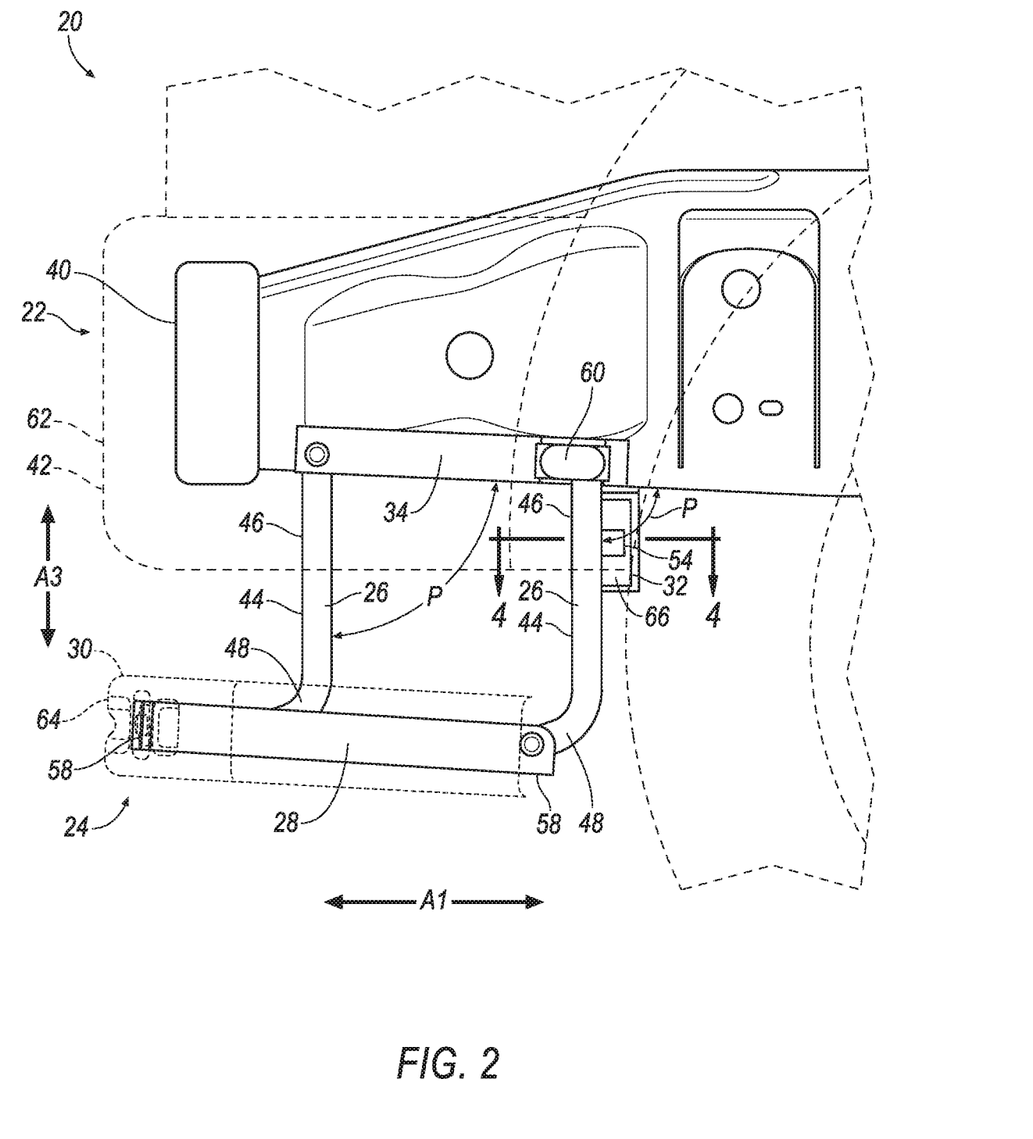
FIG. 2 is a side view of the vehicle with the stiffener assembly having the crossmember in the extended position.
Figure 3:
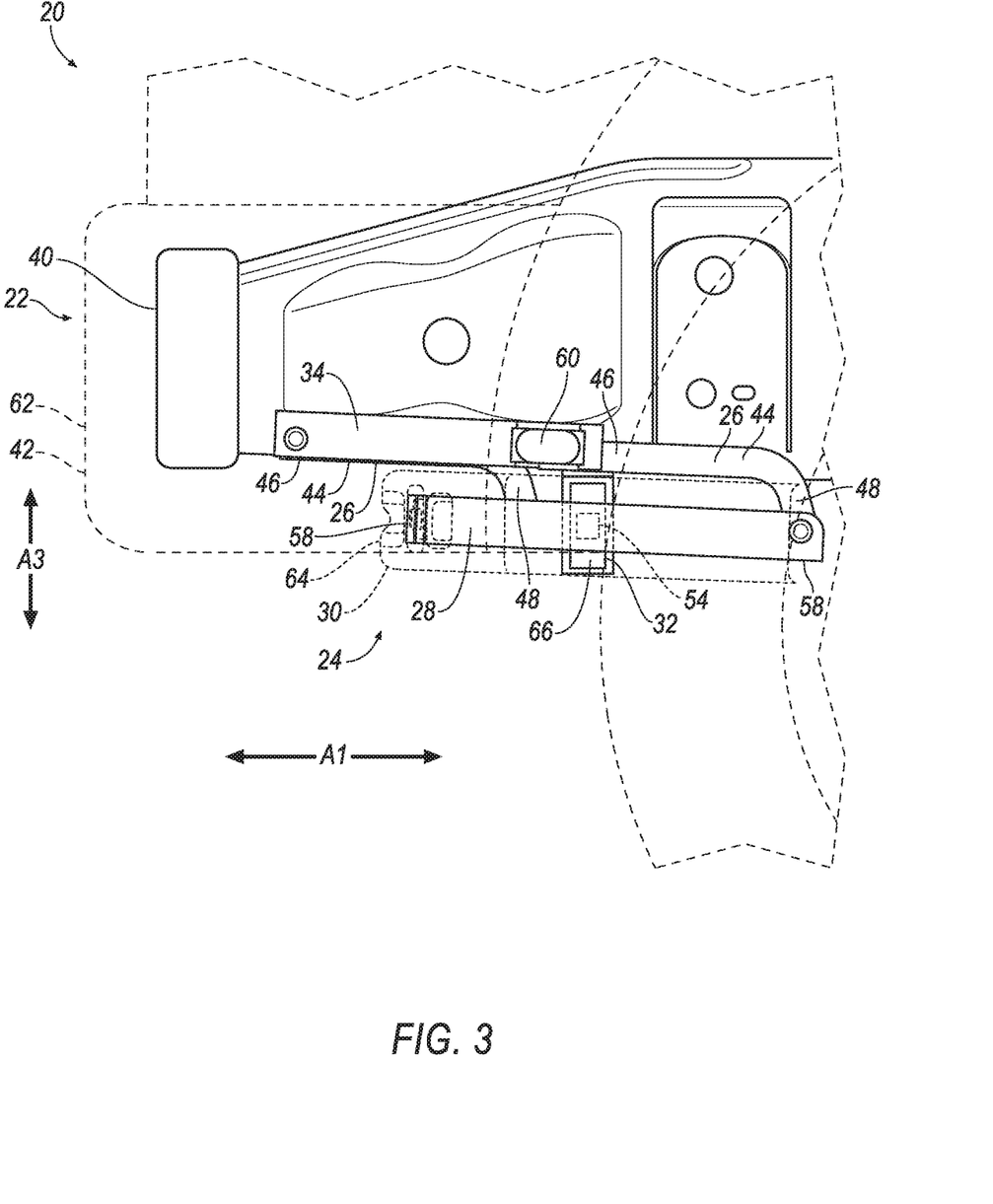
FIG. 3 is a side view of the vehicle with the stiffener assembly having the crossmember in a retracted position.
Figure 4:
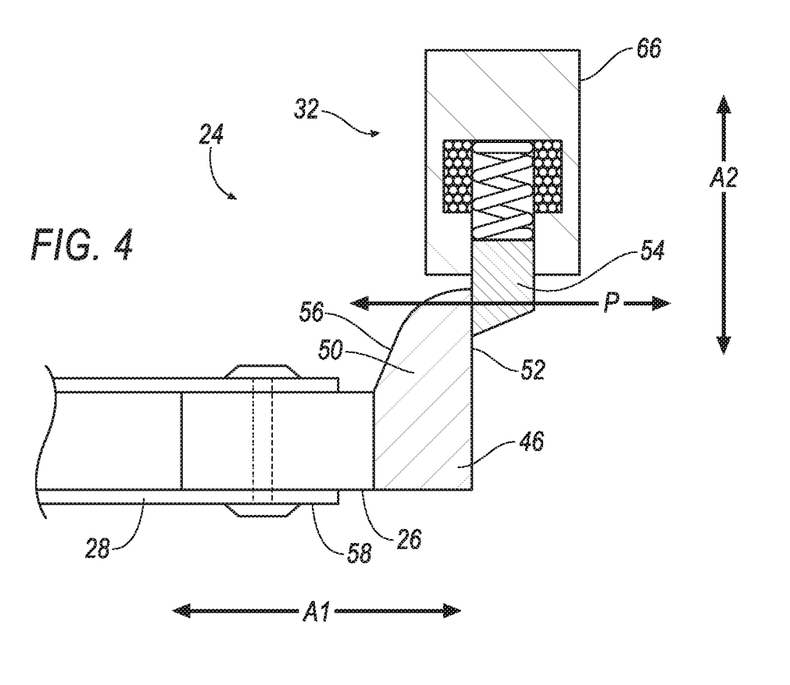
FIG. 4 is a cross-section of the stiffener assembly having the crossmember in the extended position along line 4 of FIG. 2.
Figure 5:
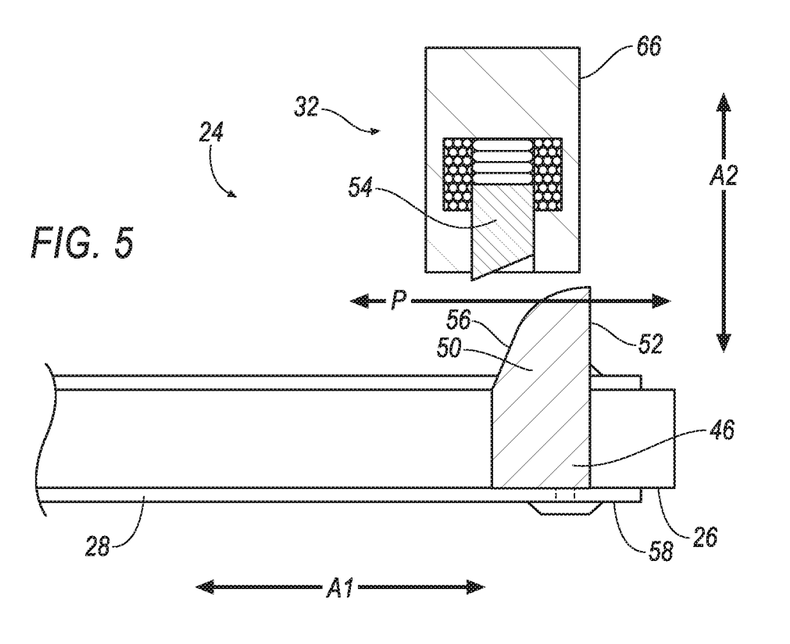
FIG. 5 is a cross-section of the stiffener assembly having the crossmember between the extended position and the retracted position.
Figure 6:
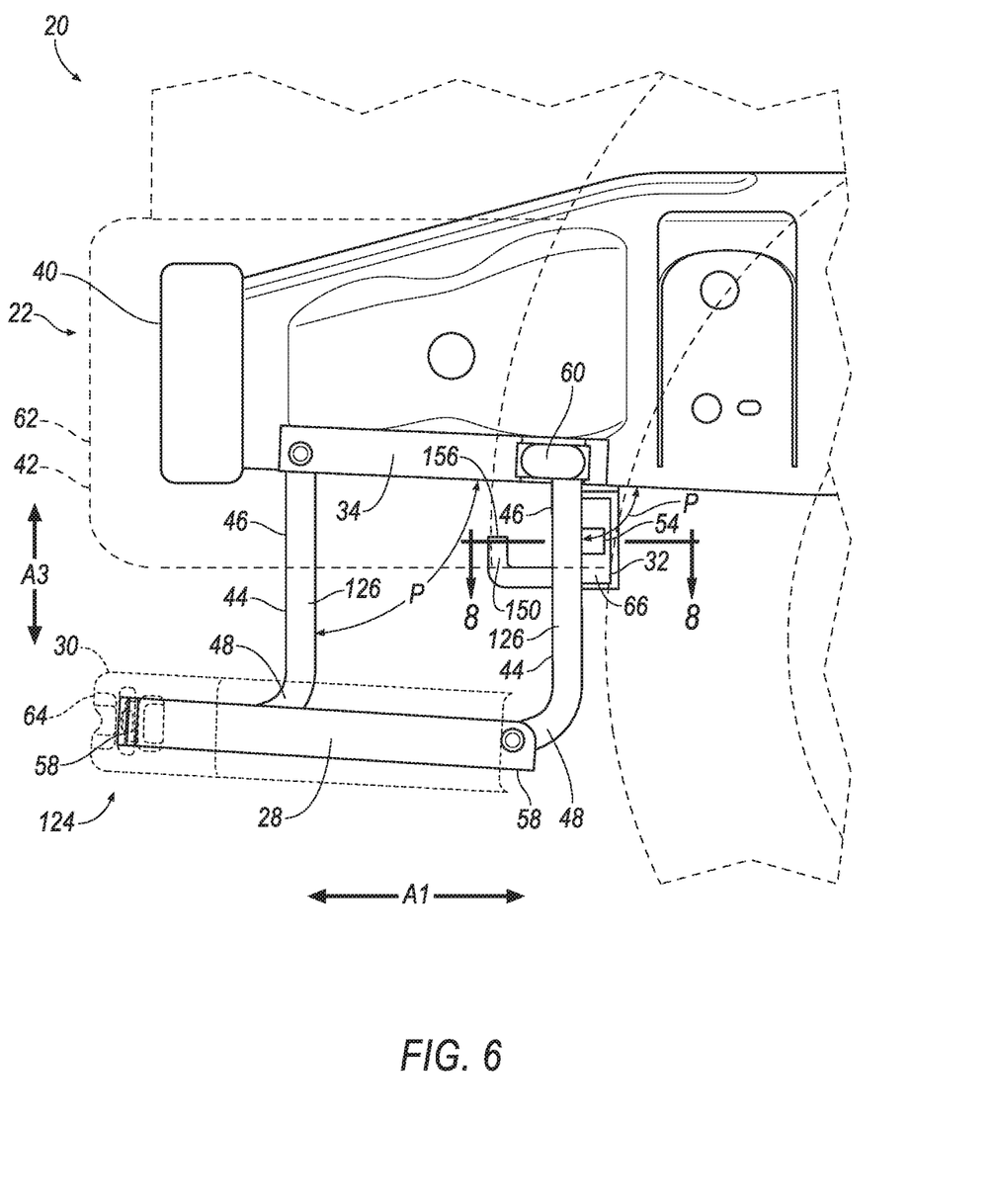
FIG. 6 is a side view of the vehicle with another embodiment of a stiffener assembly having a crossmember in an extended position.
Figure 7:
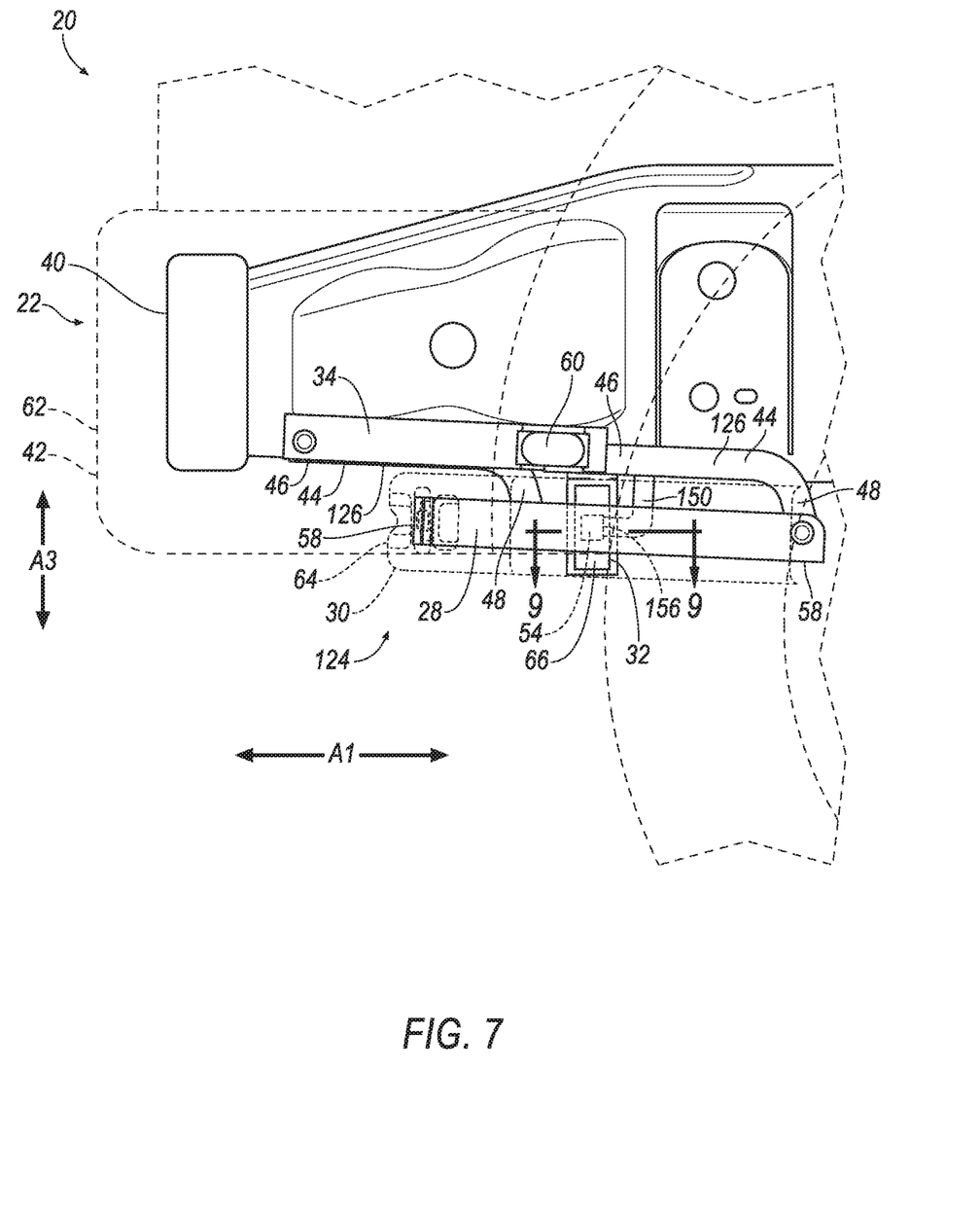
FIG. 7 is a side view of the vehicle with the stiffener assembly of FIG. 6 having the crossmember in a retracted position.
Figure 8:
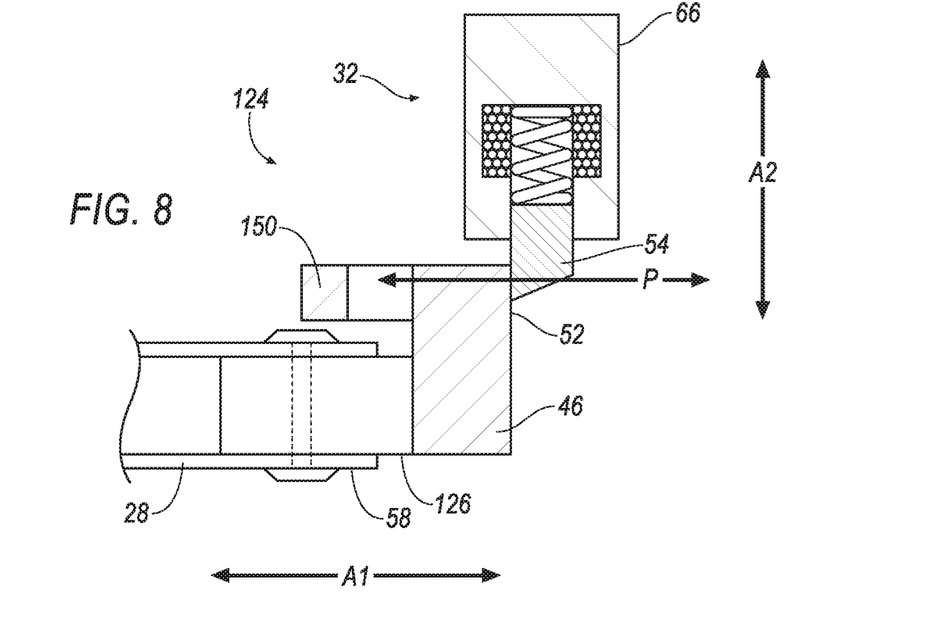
FIG. 8 is a cross-section of the stiffener assembly along line 8 of FIG. 6 having the crossmember in the extended position.
Figure 9:
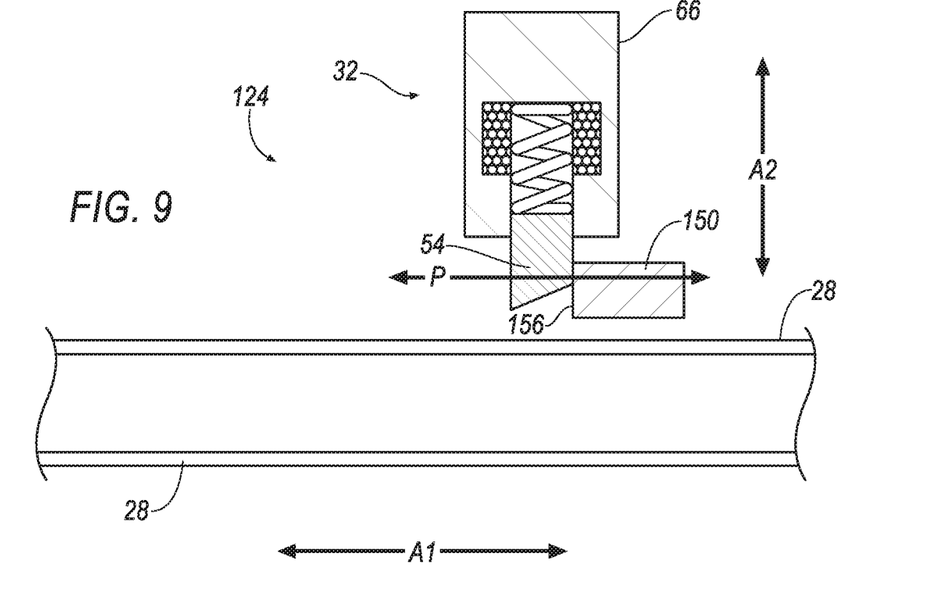
FIG. 9 is a cross-section of the stiffener assembly along line 9 of FIG. 6 having the crossmember in the retracted position.

The swing arms 26, 126 enable the crossmember 30 to move from the retracted position, shown in FIGS. 3, 7, and 9, to the extended position, shown in FIGS. 1, 2, 4, 6, and 8, and vice versa. The swing arms 26, 126 may be supported by the base 34, the frame, the body, etc. One pair of swing arms 26, 126 may be spaced from another pair of swing arms 26, 126 along the cross-vehicle axis A2. In other words, one of the pairs of swing arms 26, 126 may be proximate the right side of the vehicle 20, e.g., closer to the right side than the left side, and another pair of swing arms 26, 126 may be proximate the left side of the vehicle 20.

Each swing arm 26, 126 is pivotable along the respective path P. For example, the swing arms 26, 126 may pivot relative to the base 34, the frame, the body, etc., along the path P and to move the crossmember 30 to the extended position or retracted position. The swing arms 26, 126 are elongated along the vehicle-longitudinal axis A1 when the crossmember 30 is in the retracted position. For example, a linear portion 44 of each of the swing arms 26, 126 may be parallel to the vehicle-longitudinal axis A1 when the crossmember 30 is in the retracted position.

One or more of the swing arms 26, 126 may include a main body 46. For example, the main body 46 may include the linear portion 44. The linear portion 44 may extend from the base 34, the frame, the body, etc. The linear portion 44 may be pivotally supported by the base 34, the frame, the body, etc. The linear portion 44 may be elongated along the vehicle-longitudinal axis A1 when the crossmember 30 is in the retracted position. The linear portion 44 may be elongated along the vehicle-vertical axis A3 when the crossmember 30 is in the extended position. The main body 46 may include a curved portion 48. The curved portion 48 may extend from the linear portion 44. The curved portion 48 may be opposite the base 34, the frame, the body, etc., relative to the linear portion 44. The curved portion 48 may extend downward from the linear portion 44 relative to the vehicle 20 when the crossmember 30 is in the retracted position. The curved portion 48 may extend forward from the linear portion 44 relative to the vehicle 20 when the crossmember 30 is in the extended position.

One or more of the swing arms 26, 126 may include an extension 50, 150. The extension 50, 150 may extend transversely from the main body 46. For example, the extension 50, 150 may extend from the linear portion 44 of the swing arm 26, 126 and along the cross-vehicle axis A2.

The extension 50, 150 may abut the lock 32 when the crossmember 30 is in the extended position. For example, the extension 50, 150 may include a first surface 52 that abuts the lock 32 when the crossmember 30 is in the extended position. For example, the first surface 52 may abut a latch 54 of the lock 32 in the locked state (discussed below) when the crossmember 30 is in the extended position. A normal force between the first surface 52 and the lock 32 may maintain the crossmember 30 in the extended position, e.g., during an impact to the vehicle 20. In other words, the first surface 52 abutting the lock 32 may prevent the crossmember 30 from moving from the extended position toward the retracted position.

With reference to the stiffener assembly 24 shown in FIGS. 1-5, one or more of the swing arms 26 may include a second surface 56 that urges the lock 32 to the unlocked state when the crossmember 30 is moved from the retracted position to the extended position. For example, a normal force generated between the second surface 56 and the lock 32 as the respective swing arm 26 moves from the retracted position to the extended position may urge the latch 54 of the lock 32 to the unlocked state (discussed below). The second surface 56 of one of the swing arms 26 may be on the extension 50 of such swing arm 26. The second surface 56 may extend at an angle between 20 and 70 degrees relative to the path P of the respective swing arm 26.

With reference to the stiffener assembly 124 shown in FIGS. 6-9, one more of the swing arms 126 may include a second surface 156 that abuts the lock 32 when the crossmember 30 is in the retracted position. The second surface 156 may abut the latch 54 of the lock 32 in the locked state when the crossmember 30 is in the retracted position. For example, a normal force between the second surface 156 and the latch 54 of the lock 32 in the locked state may maintain the crossmember 30 in the retracted position. In other words, the second surface 156 abutting the lock 32 may prevent the crossmember 30 from moving from the retracted position toward the extended position. The second surface 156 of one of the swing arms 26, 126 may be on the extension 150 of such swing arm 126. The second surface 156 may extend perpendicular to the path P of the respective swing arm 126.

Returning to FIGS. 1-10, each beam 28 connects the swing arms 26, 126 to the crossmember 30. The beams 28 may each be elongated between distal ends 58 along the vehicle-longitudinal axis A1. Each beam 28 is pivotally supported by one of the pairs of the swing arms 26, 126. For example, the beam 28 may be pivotally fixed to the curved portions 48 of the respective swing arms 26, 126 between the distal ends 58 of the beam 28, e.g., via a hinge pin or any other suitable structure. The beams 28 may be fixed to the crossmember 30, e.g., at one of the distal ends 58 of the beam 28 at a front of the beam 28 relative to the vehicle 20.

The crossmember 30 may extend from the first end 36 to the second end 38 of the bumper 22. The cross member may be elongated along the cross-vehicle axis A2. In other words, the crossmember 30 may extend across a width of the vehicle 20, e.g., between the right side and the left side of the vehicle 20. The crossmember 30 may be metal, or any other suitable material. The crossmember 30 may be fixed to one or more of the beams 28 via fasteners, welding, etc.

The crossmember 30 is movable from the retracted position toward the bumper 22 to the extended position, e.g., via actuation of a motor 60. In the extended position the crossmember 30 may be below the bumper 22, e.g., relative to the vehicle-vertical axis A3, and aligned with the bumper 22, e.g., relative to the vehicle-longitudinal axis A1. For example, in the extended position a front surface 62 of the bumper 22 and a front surface 64 of the crossmember 30 may be at a same position along the vehicle-longitudinal axis A1, with the bumper 22 above the crossmember 30 along the vehicle-vertical axis A3. The crossmember 30 in the extended position improves performance of the vehicle 20 in safety tests that attempt to measure or estimate the degree of injury that will be inflicted on a lower leg of a pedestrian if struck by the vehicle 20 by decreasing ground clearance at the front of the vehicle 20. The crossmember 30 is movable from the extended position away from the bumper 22 to the retracted position, e.g., via actuation of the motor 60. In the retracted position the crossmember 30 may be behind the bumper 22 and higher, relative to the vehicle-vertical axis A3, than in the extended position. The crossmember 30 in the retracted position provides greater ground clearance to the vehicle 20, e.g., compared to the extended position, increasing the performance of the vehicle 20 and reducing a likelihood of damaging the crossmember 30 when operating the vehicle 20 off a paved road, e.g., on a so called "two-track" trail, on a seasonal road, on a surface not conditioned for vehicle traffic, etc.

The lock 32 may maintain the crossmember 30 in the extended position, e.g., the lock 32 may operatively engage one of the swing arms 26, 126 when the crossmember 30 is in the extended position. The lock 32 may maintain the crossmember 30 in the retracted position, e.g., the lock 32 may operatively engage one of the swing arms 26, 126 when the crossmember 30 is in the retracted position. The lock 32 may include a main body 66 and the latch 54. The lock 32 may be moveable between the locked state, shown in FIGS. 4, 8, and 9, and the unlocked state, shown in FIG. 5. For example, the latch 54 may extend further from the main body 66 in the locked state that in the unlocked state. The lock 32 may include circuits, chips, actuators, etc., to move the lock 32 between the locked state and the unlocked state, e.g., to move the latch 54 relative to the main body 66. The lock 32 may move to the locked state or the unlocked state in response to receiving a command from a computer 70. The lock 32 may be supported by the base 34 or any other suitable structure.

The lock 32 in the locked state may be in the path P of one of the swing arms 26, 126. In other words, the lock 32 in the locked state may provide a physical barrier inhibiting moment of one of the swing arms 26, 126 along its respective path P. For example, the latch 54 of the lock 32 in the locked state may be in the path P of one of the swing arms 26, 126.

The lock 32 in the unlocked state may be spaced from the paths P of all the swing arms 26, 126. In other words, the lock 32 in the unlocked state may not provide a physical barrier inhibiting moment of one of the swing arms 26, 126 along its respective path P. For example, the latch 54 of the lock 32 in the unlocked state may not be in the path P of one of the swing arms 26, 126.

The stiffener assembly 24, 124 may include multiple locks 32. For example, one lock 32 may be supported by each base 34 and operatively engage one of the swing arms 26, 126 of the respective pair of swing arms 26, 126 of such base 34 when the crossmember 30 is in the extended position or the retracted position.

The stiffener assembly 24, 124 may include one of more motors 60. Each motor 60 may be supported by one of the bases 34. Each motor 60 may be operatively coupled to one of the swing arms 26, 126. Actuation of the motor 60 pivots the operatively coupled swing arm 26, 126 along the respective path P. For example, the motor 60 may be coupled to the respective swing arm 26, 126 via a shaft, gears, chain and sprockets, wheel and pulleys, etc., such that torque from a driveshaft of the motor 60 is transferred to the respective swing arm 26, 126. The motor 60 may be a servo motor, a brushed motor, a brushless motor, etc. The motor 60 may actuate and pivot the respective swing arm 26, 126 in response to receiving an instruction from the computer 70. Other structures, systems, and assemblies may be used to pivot the swing arms 26, 126, e.g., linear actuators, magnetic devices, hydraulic systems, electromechanical systems, rack and pinion assemblies, etc.

Figure 10:
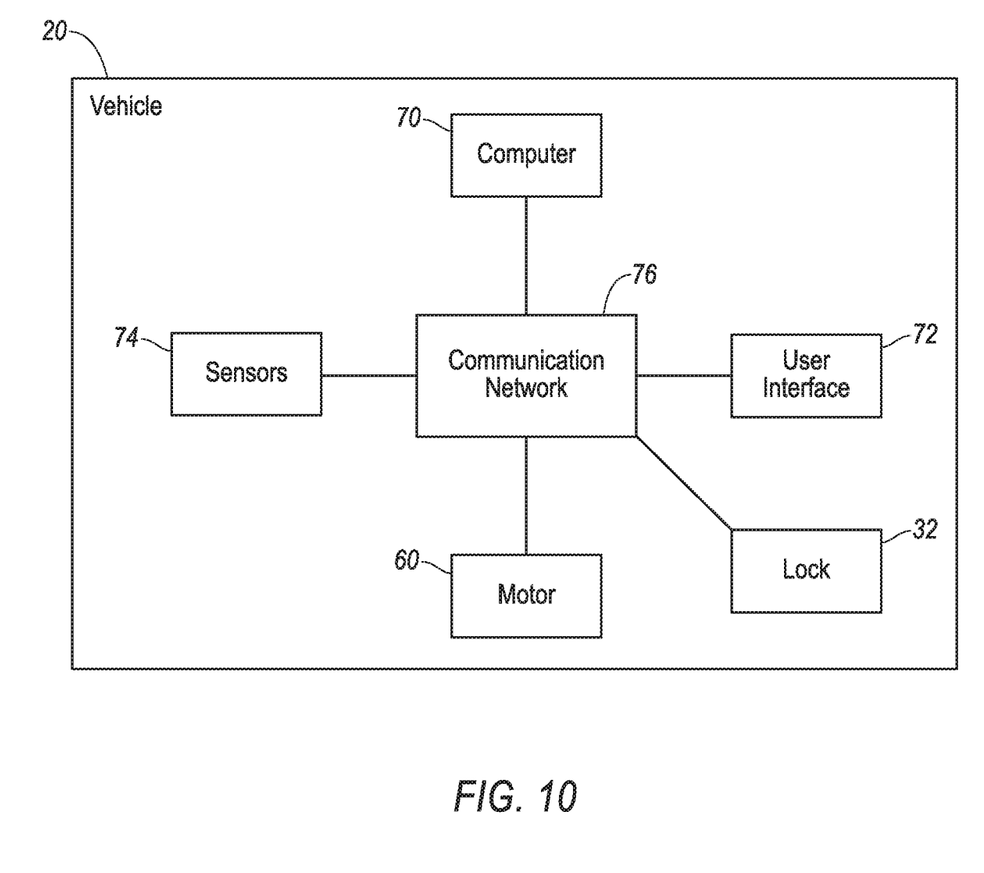
FIG. 10 is a block diagram of components of the vehicle.

With reference to FIG. 10, the vehicle 20 may include the user interface 72. The user interface 72 presents information to and receives information from an occupant of the vehicle 20. The user interface 72 may be located, e.g., on an instrument panel in a passenger cabin of the vehicle 20, or wherever may be readily seen by the occupant. The user interface 72 may include dials, digital readouts, screens such as a touch-sensitive display screen, speakers, and so on for providing information to the occupant, e.g., human-machine interface (HMI) elements. The user interface 72 may include buttons, knobs, keypads, microphone, and so on for receiving information from the occupant.

The vehicle 20 may include sensors 74. The sensors 74 may detect internal states of the vehicle 20, for example, wheel speed, wheel orientation, and engine and transmission variables. The sensors 74 may detect the position or orientation of the vehicle 20, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 74 may detect the external world, for example, radar sensors, scanning laser range finders, light detection and ranging (LIDAR) devices, and image processing sensors such as cameras. The sensors 74 may include communications devices, for example, vehicle-to-infrastructure (V2I) or vehicle-to-vehicle (V2V) devices.

The vehicle 20 may include a communication network 76. The communication network 76 includes hardware, such as a communication bus, for facilitating communication among vehicle 20 and stiffener assembly 24, 124 components. For example, the communication network 76 may facilitate wired or wireless communication between the lock 32, the motor 60, the computer 70, the user interface 72, the sensors 74, etc., in accordance with a number of communication protocols such as controller area network (CAN), Ethernet, WiFi, Local Interconnect Network (LIN), and/or other wired or wireless mechanisms.

The computer 70 may be a microprocessor-based computer implemented via circuits, chips, or other electronic components. For example, the computer 70 may include a processor, a memory, etc. The memory of the computer 70 may store instructions executable by the processor as well as electronically storing data and/or databases. Although one computer 70 is shown in FIG. 10 for ease of illustration, it is to be understood that the computer 70 could include, and various operations described herein could be carried out by, one or more computing devices.

The computer 70 may be programmed to determine whether a speed of the vehicle 20 is greater than a predetermined threshold. For example, one or more predetermined threshold speeds, e.g., 5 miles per hour (mph), 55 mph, etc., may be stored in the memory of the computer 70. The computer 70 may compare a detected speed of the vehicle 20, e.g., based on information received from one or more sensors 74 via the communication network 76, with one or more of the stored predetermined thresholds. When such comparison indicates that the detected speed is above the compared predetermined threshold speed, the computer 70 determines that the speed of the vehicle 20 is greater than the predetermined threshold. When such comparison indicates that the detected speed is not above the compared predetermined threshold speed, the computer 70 determines that the speed of the vehicle 20 is not greater than the predetermined threshold.

The computer 70 may be programmed to move the crossmember 30 to the extended position. For example, the computer 70 may transmit a command to the motor 60 instructing actuation of the motor 60 to move the crossmember 30 from the retracted position to the extended position. The computer 70 may move the crossmember 30 to the extended position upon determining the vehicle speed is greater than a lower predetermined threshold, e.g., 5 mph. The lower predetermined threshold may be relative to an upper predetermined threshold, e.g., 55 mph.

The computer 70 may be programmed to move the crossmember 30 to the retracted position. For example, the computer 70 may transmit a command to the motor 60 instructing actuation of the motor 60 to move the crossmember 30 from the extended position to the retracted position. The computer 70 may move the crossmember 30 to the retracted position upon determining the vehicle speed is greater than the upper predetermined threshold. The upper predetermined threshold is higher than the lower predetermined threshold. The computer 70 may move the crossmember 30 to the retracted position upon determining the vehicle speed is less than the lower predetermined threshold.

The computer 70 may be programmed to disengage the lock 32 from the swing arm 26, 126. For example, the computer 70 may transmit a command to the lock 32 via the communication network 76 instructing actuation of the lock 32 to the unlocked state. The computer 70 may disengage the lock 32 before moving the crossmember 30. In other words, the computer 70 may disengage the lock 32 from the swing arm 26, 126, e.g., by actuating the lock 32 to the unlocked state, and then move the crossmember 30 to the retracted position or to the extended position, e.g., by actuating the motor 60.

The computer 70 may be programmed to engage the lock 32 with the swing arm 26, 126. For example, the computer 70 may transmit a command to the lock 32 via the communication network 76 instructing actuation of the lock 32 to the locked state. The computer 70 may operatively engage the lock 32 with one of the swing arms 26, 126 after moving the crossmember 30. In other words, the computer 70 may move the crossmember 30 to the extended position, or the retracted position, and then actuate the lock 32 to operatively engage one of the swing arms 26, 126, e.g., by actuating the lock 32 to the locked state.

The computer 70 may be programmed to identify a mode of the vehicle 20. The mode of the vehicle 20 includes a set of parameters for operating various components of the vehicle 20. For example, the parameters may include a ride height of the vehicle 20, a gear selection to control an amount of torque delivered to wheels of the vehicle 20, the position of the crossmember 30, a selection of wheels to be provided power, e.g., two-wheel drive, all-wheel drive, four-wheel drive, etc. The computer 70 may identify the mode as an off-road mode, i.e. a mode having parameters for operating various components of the vehicle 20 to optimize operation of the vehicle 20 off of paved surfaces. In the off-road mode the computer 70 may move the crossmember 30 to the retracted position, inhibit moving the crossmember 30 to the extended position, select all-wheel or four-wheel drive, select a low gear, e.g., providing higher torque relative to other available gear selections of the vehicle 20, operate the vehicle 20 at a higher ride height, e.g., relative to other available ride heights of the vehicle 20, etc. The modes of the vehicle 20 may be stored in the memory of the computer 70. The mode of the vehicle 20 may be selected by via input to the user interface 72, based on a location of the vehicle 20, e.g., a GPS location detected by the sensors 74, etc. For example, the computer 70 may operate the vehicle 20 in the off-road mode in response selection of the off-road mode, e.g., via the user interface 72.

Figure 11:
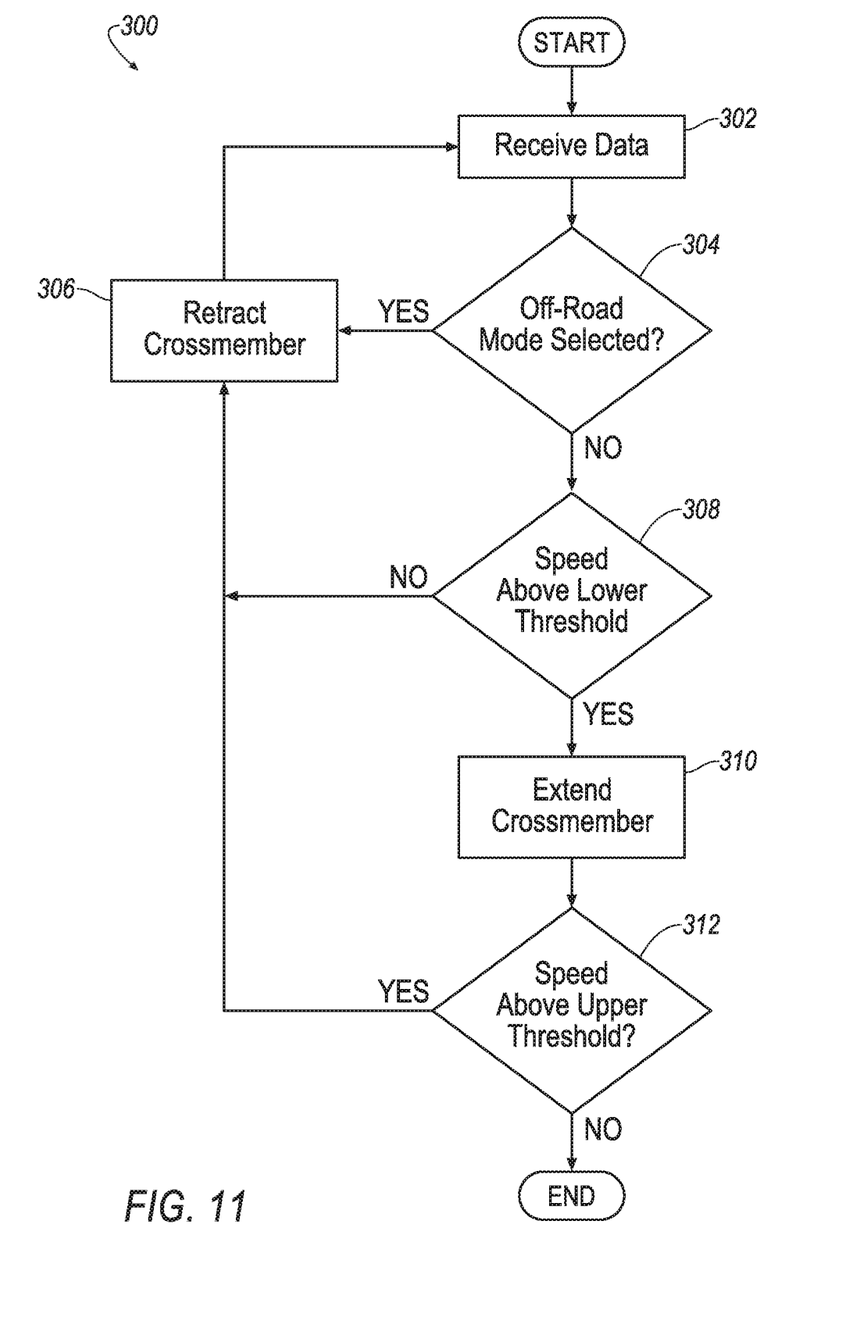
FIG. 11 is a flow chart illustrating a process for controlling the stiffener assembly.

FIG. 11 is a process flow diagram illustrating an exemplary process 300 for controlling the stiffener assembly 24, 124. The process 300 begins in a block 302 where the computer 70 receives data, e.g., from the sensors 74, the user interface 72, etc., e.g., via the communication network 76. The computer 70 may continue to receive data throughout the process 300. Throughout the process 300 in the present context means substantially continuously or at time intervals, e.g., every 50, 150 milliseconds.

Next, at a block 304 the computer 70 determines whether the off-rode mode has been selected, e.g., based on information from the user interface 72. Upon a determination that the off-road mode has been selected, the process 300 moves to a block 306. Upon a determination that the off-rode mode has not been selected, the process 300 moves to a block 308.

At the block 306 the computer 70 actuates the lock 32 to disengage the swing arm 26, 126, e.g., by transmitting a command to the lock 32 via the communication network 76 instructing actuation to the unlocked state. After disengaging the lock 32, the computer 70, then moves the crossmember 30 to the retracted position, e.g., by transmitting a command to the motor 60. Next, the computer 70 operatively engages the lock 32 with the swing arm 26, 126, e.g., by transmitting a command instructing actuation to the locked state. After the block 306 the process 300 may return to the block 302. Alternately the process 300 may end.

At the block 308 the computer 70 determines whether a speed of the vehicle 20 is above the lower predetermined threshold, e.g., based on information from the sensors 74. Upon determining the vehicle speed is above the lower predetermined threshold the process 300 moves to a block 310. Upon determining the vehicle speed is not above the lower predetermined threshold, e.g., by determining the vehicle speed is below the lower predetermined threshold, the process moves to the block 306.

At the block 310 the computer 70 actuates the lock 32 to disengage the swing arm 26, 126, e.g., by instructing actuation of the lock 32 to the unlocked state. After disengaging the lock 32, the computer 70 then moves the crossmember 30 to the extended position, e.g., by transmitting a command to the motor 60. Next, the computer 70 operatively engages the lock 32 with the swing arm 26, 126, e.g., by transmitting a command instructing actuation to the locked state. After the block 310 the process 300 may move to a block 312.

At the block 312 the computer 70 determines whether a speed of the vehicle 20 is above the upper predetermined threshold. Upon determining the vehicle speed is above the upper predetermined threshold the process 300 moves to the block 306. Upon determining the vehicle speed is not above the upper threshold the process 300 may end. Alternately the process 300 may return to the block 302.

Computing devices, such as the computer 70, generally include computer-executable instructions, where the instructions may be executable by one or more computing devices such as the computer. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a bumper;
a pair of swing arms;
a beam pivotally supported by the swing arms;

a crossmember fixed to the beam and movable from a retracted position toward the bumper to an extended position; and a lock operatively engaging one of the swing arms when the crossmember is in the extended position.

2. The vehicle of claim 1, further comprising a processor and a memory storing instructions executable by the processor to, upon determining a vehicle speed is greater than a predetermined threshold, disengage the lock from the swing arm and then move the crossmember to the retracted position.

3. The vehicle of claim 1, wherein the lock operatively engages one of the swing arms when the crossmember is in the retracted position.

4. The vehicle of claim 3, further comprising a processor and a memory storing instructions executable by the processor to, upon determining a vehicle speed is greater than a predetermined threshold, actuate the lock to disengage from one of the swing arms and then move the crossmember to the extended position.

5. The vehicle of claim 4, wherein the memory further stores instructions executable by the processor to, upon determining the vehicle speed is greater than a second predetermined threshold that is higher than the predetermined threshold, actuate the lock to disengage from one of the swing arms and then move the crossmember to the retracted position.

6. The vehicle of claim 4, wherein the memory further stores instructions executable by the processor to inhibit moving the crossmember to the extended position in response selection of an off-road mode.

7. The vehicle of claim 1, further comprising a processor and a memory storing instructions executable by the processor to move the crossmember to the extended position and then actuate the lock to operatively engage one of the swing arms.

8. The vehicle of claim 1, wherein the swing arms are elongated along a vehicle-longitudinal axis when the crossmember is in the retracted position.

9. The vehicle of claim 1, wherein the bumper includes a first end and a second end spaced from each other along a cross-vehicle axis, and the crossmember extends from the first end to the second end.

10. The vehicle of claim 1, wherein the lock includes a latch, and one of the swing arms includes a first surface that abuts the latch when the crossmember is in the extended position and a second surface that abuts the latch when the crossmember is in the retracted position.

11. The vehicle of claim 1, wherein one of the swing arms includes a linear portion and a curved portion extending from the linear portion.

12. The vehicle of claim 1, further comprising a second pair of swing arms spaced from the pair of swing arms along a cross-vehicle axis, a second beam pivotally supported by the second pair of swing arms, the second beam fixed to the crossmember, and a second lock operatively engaging one of the swing arms of the second pair of swing arms when the crossmember is in the extended position.

13. An assembly comprising:

a base;

a pair of swing arms supported by the base, each pivotable along a path;

a beam pivotally supported by the swing arms;

a crossmember fixed to the beam; and a lock supported by the base and moveable between a locked state in the path of one of the swing arms and an unlocked state spaced from the paths of both the swing arms.

14. The assembly of claim 13, wherein one of the swing arms includes a main body and an extension extending transversely from the main body and abutting the lock when the crossmember is in an extended position.

15. The assembly of claim 13, further comprising a motor supported by the base and operatively coupled to one of the swing arms.

16. The assembly of claim 13, wherein the lock operatively engages one of the swing arms when the crossmember is in a retracted position.

17. The assembly of claim 13, wherein the lock operatively engages one of the swing arms when the crossmember is in an extended position.

18. The assembly of claim 13, wherein one of the swing arms includes a first surface that abuts the lock when the crossmember is in the extended position and a second surface that abuts the lock when the crossmember is in a retracted position.

19. The assembly of claim 13, wherein one of the swing arms includes a first surface that abuts the lock when the crossmember is in the extended position and a second surface that urges the lock to the unlocked state when the crossmember is moved from a retracted position to the extended position.

20. The assembly of claim 13, wherein one of the swing arms includes a linear portion extending from the base and a curved portion extending from the linear portion.

* * * * *